INVENTORS
RAYMOND A. MUIRHEAD
SUREN A. VARJABEDIAN
BY
*Burton E. Parker*
ATTORNEYS Aug. 2, 1966 R. A. MUIRHEAD ETAL 3,263,798
ARTICLE TRANSFER DEVICE
Filed July 27, 1964 6 Sheets-Sheet 5

INVENTORS
RAYMOND A. MUIRHEAD
SUREN A. VARJABEDIAN
BY
*Burton & Parker*
ATTORNEYS

United States Patent Office 3,263,798
Patented August 2, 1966

3,263,798
ARTICLE TRANSFER DEVICE
Raymond A. Muirhead, Detroit, Mich., and Suren A. Varjabedian, South Windsor, Ontario, Canada, assignors to Taylor & Gaskin, Inc., Detroit, Mich., a corporation of Michigan
Filed July 27, 1964, Ser. No. 385,278
17 Claims. (Cl. 198—179)

This invention relates to apparatus for transferring articles and contemplates a transfer head which traverses back and forth along an article pathway adjacent the pathway with the head having an article engaging member which swings into the pathway to engage an article thereon at the beginning of the traverse of the head in one direction along the pathway to move the article along the pathway during the traverse, and then swings away from the pathway upon return traverse of the head to the starting position.

The invention is shown in connection with an automobile conveyor where it is desired to transfer vehicles at the end of one assembly line to the head of another assembly line, for example when the assembly line reaches the end of the building and it is necessary to start the vehicles down an oppositely running line.

In general the object of the invention is the provision of an article transfer device which is of relatively simple, foolproof construction, capable of transferring relatively heavy articles, such as automobiles, and which will engage the automobiles at one station and move them to and release them at another station. As the description proceeds, other objects and uses for the apparatus will occur to those skilled in the art.

Other objects, advantages and meritorious features will more fully appear from the following specification, claims and accompanying drawings, wherein:

FIG. 6 is a cross-sectional view taken on the line 6—6 of FIG. 5;

FIG. 9 is a schematic electrical diagram of the control circuit for the system shown in FIG. 1.

Figure 1:
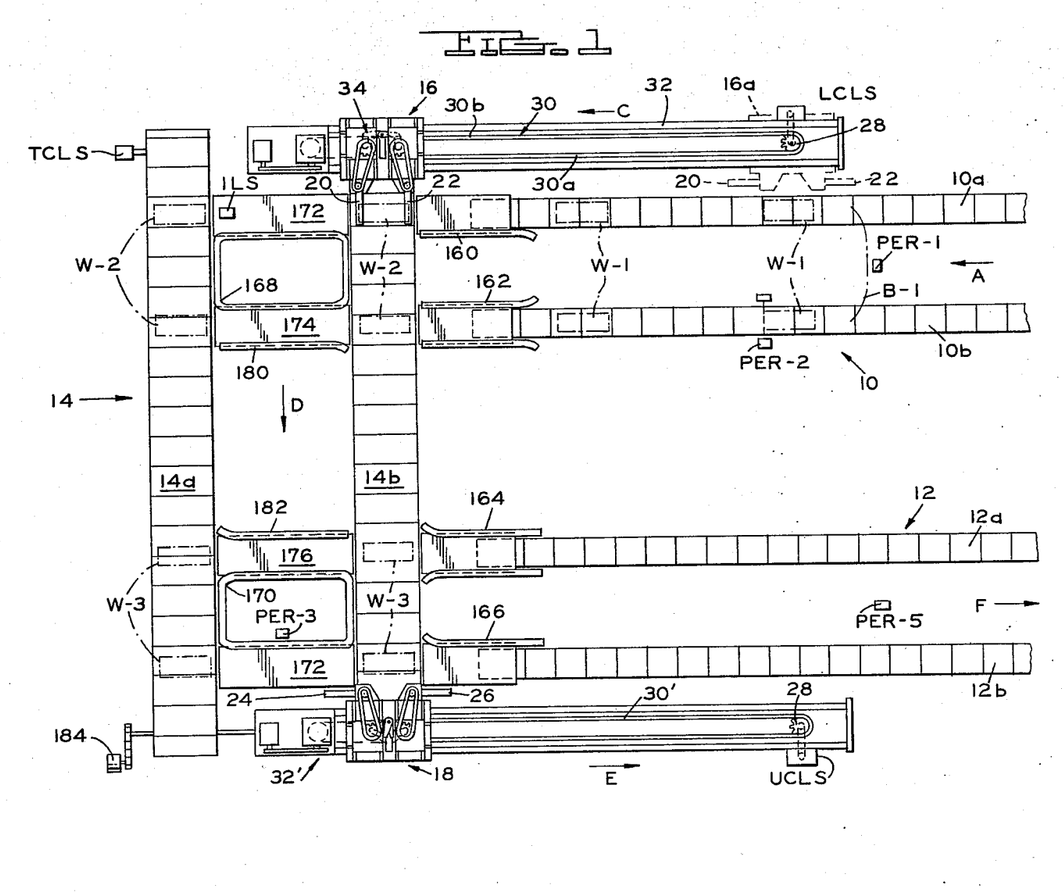
FIG. 1 is a plan view of a transfer apparatus embodying the invention.

FIG. 1 discloses, somewhat schematically, transfer apparatus associated with an automobile conveyor system and is adapted to transfer vehicles from the head end 10 of one conveyor runway to the tail end 12 of another conveyor runway, for example where it is desirable to reverse the direction of movement of the vehicles on an assembly line because the line has reached the end of the building. The transfer apparatus includes a third conveyor 14 which is contiguous to and extends between the ends of conveyors 10 and 12 with a pair of transfer heads 16 and 18 associated with each of the main conveyors 10 and 12 and that portion of the third conveyor 14 contiguous thereto. The heads are for the purpose of sweeping the vehicles from conveyor 10 to conveyor 14 and from the latter to conveyor 12 to complete the transfer between conveyors 10 and 12.

The particular construction of conveyors 10 and 12 is not pertinent to the broader aspects of this disclosure, but in the specific embodiment of FIG. 1 each is of the so-called flat top type and comprises a runway along which the vehicles are successively moved as by power-driven vehicle supporting spans 10a, 10b, 12a and 12b. Spans 10a and 10b move simultaneously to deliver successive vehicles in the direction of arrow A to the phantom outlined position W–1 of the four vehicle wheels. The rear bumper of the vehicle in this position is indicated at B–1. The mechanism for driving the spans 10a, 10b, 12a and 12b is not disclosed as it is unnecessary to an understanding of the invention. Suffice it to say that such mechanism is capable of moving the spans and stopping them whereby a vehicle may be brought to the phantom wheel outline position W–1 with the rear bumper of such vehicle disposed at B–1.

In this position of the vehicle a control system connected to the drive mechanism for the transfer head 16, and which system includes detectors PER–1 and PER–2, initiates operation of a cycle of movement of the transfer head at its phantom position 16a, to cause a pair of article embracing fingers 20 and 22 mounted on the transfer head to swing to a closed position embracing a rear wheel of the vehicle, then cause the head to shift in the direction of arrow C to the position shown in solid outline where the vehicle wheels are disposed at W–2 resting on the spans 14a and 14b of conveyor 14, and subsequently cause the fingers to swing to their open position and the head to return to its starting position at 16a. As the vehicle approaches position W–2, one of the wheels trips a detector 1–LS which is connected in a control circuit to the drive mechanism for conveyor 14, such that when the vehicle reaches its W–2 position, the conveyor 14 is actuated to shift the vehicle in the direction of arrow D. At the downstream end of span 14b the transfer head 18 is shown awaiting reception of a rear wheel of the vehicle. When the vehicle reaches the wheel position outlined at W–3, and assuming no vehicle is being sensed by detector PER–5, a cycle of operation of transfer head 18 is initiated in which wheel embracing fingers 24 and 26 pivotally mounted on head 18 swing from the open position shown to a closed position, similar to that shown in full outline of head 16, to embrace the wheel, the head then shifting in the direction of arrow E transfers the vehicle along the runway to the spans 12a and 12b of conveyor 12, the fingers then opening and the head returning to its starting position to await the next vehicle. Spans 12a and 12b serve to convey the vehicle away from the apparatus in the direction of arrow F.

In its broader aspects the invention comprises a transfer device, such as either head 16 or 18, and related structure, for transferring articles along an intended path of travel such as from the W–1 to the W–2 positions heretofore mentioned. The device includes a pair of chain sprockets, only one of which is shown at 28 (or 28' in the case of head 18), which are disposed in spaced apart relation along the intended path of article travel, as for example adjacent opposite ends thereof. The sprockets are mounted for rotation on parallel axes, which are shown as perpendicular to the upwardly facing planar article supporting surfaces of the runways and at one side thereof. An endless chain 30 is entrained over the sprockets and extends therebetween. Drive means 32 is coupled in any convenient fashion to one of the sprockets to drive it and the chain in one direction. Control means schematically shown in FIG. 9 is coupled to the drive means to selectively start and stop it in response to determined signals originating from the detection of an article to be transferred by the device along the runway.

The transfer head is supported for reciprocation above the sprockets upon a guideway 32 which parallels the runway and holds the head to a fixed rectilinear path of travel. Mounted on the head are the article embracing members or fingers 20 and 22 which are swingable over the runway between positions of article engagement and non-engagement. Means 34 connects the head to the chain to cause the head to reciprocate on the guideway as the chain runs around the sprockets with such means being connected to the fingers or article embracing members to swing them from the open position to the closed position as the point of connection to the chain passes around sprocket 28, and swing the arms to the open position as such point of connection passes around the other sprocket.

Figure 2:
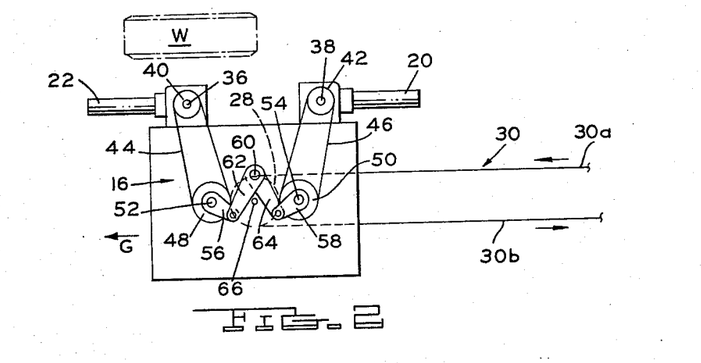
FIGS. 2, 3 and 4 are schematic representations illustrating the operation of the article embracing fingers on a transfer head.
Figure 3:
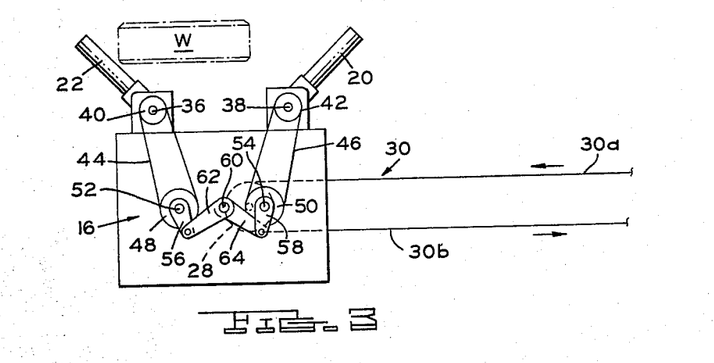
Figure 4:
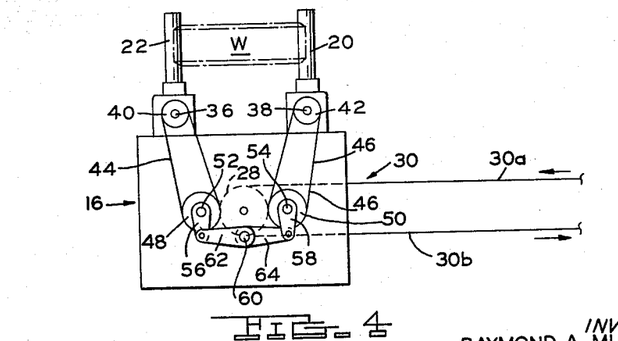

The means connecting the transfer head to the chain and the operation thereof to swing the arms is schematically shown in FIGS. 2–4 inclusive where the transfer head 16, which may be considered as representative of head 18 as well, is awaiting initiation of the aforementioned cycle of operation which will cause the head to perform its article engaging and transfer functions. The head has reached such position, which would correspond with the phantom outline position 16a in FIG. 1, by movement in the direction of the arrow E, i.e. in the direction of movement of span 30a of the drive chain 30. Mounted on the head for pivotal movement on axes 36 and 38 is the pair of article embracing members or fingers 20 and 22. Operatively connected to the fingers to swing them are sprockets 40 and 42, one for each. Operating chains 44 and 46 connect sprockets 40 and 42 to another pair of sprockets 48 and 50 which rotate about axes 52 and 54 and are connected to cranks 56 and 58 which drive such chain connected sprockets.

Connected to the drive chain 30 by a pin 60 and which pin forms the operative point of connection of the head to the chain, are the ends of a pair of links 62 and 64, the opposite ends of which are connected respectively to cranks 56 and 58. The links and cranks and associated structure provide a lost motion coupling between the head and chain, with the sprockets 40, 42, 48 and 50 together with the chains 46 and 44 providing a drive connection between the lost motion coupling and the arms. As will be hereinafter explained, pin 60 is carried by a cross-head supported on head 16 for movement transversely thereof, whereby upon movement of the pin 60 with the chain between the sprockets, i.e. along the length of spans 30a and 30b, the head 16 is reciprocated between the sprockets.

With this arrangement, as pin 60 passes counterclockwise around the main drive chain sprocket 28, whose center of rotation is fixed at 66, the arms 24 and 26 are swung from the open position toward each other to the closed article embracing position as illustrated in FIGS. 3 and 4, such that in FIG. 4 upon continued movement of the chain 30 in the direction of the arrows associated with it, the force of pin 60 reacting through the cross-head (hereinafter described) will draw the head 16 in the direction of movement of span 30b of the drive chain. When the head 16 reaches the other drive sprocket at the opposite end of the chain spans and the pin 60 passes 180 degrees therearound, links 62 and 64 will serve to swing the arms to the open position and in such position the head will return in the direction of movement of span 30a to the position shown in FIG. 2.

It will be noted that by virtue of the swinging movement of the article embracing arms from the open position of FIG. 2 to the closed position of FIG. 4, the sweeping action of the arms will shift an article, such as wheel W, which was not in precise registry with the head, into registry therewith and embraced relationship by the arms. This is of particular value in handling heavy articles, such as automobiles, whose position for pickup by the transfer device may not always be wholly accurate.

Figure 7:
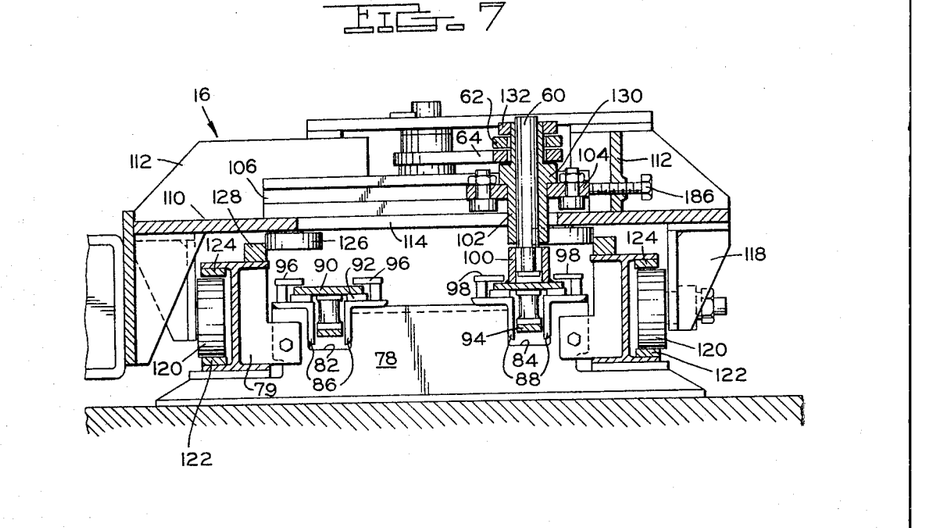
FIG. 7 is a cross-sectional view taken on the line 7—7 of FIG. 5.

To illustrate more fully the construction of a typical transfer head, head 16 is shown in FIGS. 5–8 inclusive as though the article embracing arms had just shifted to the closed, article embracing, position at sprocket 28. Such condition would correspond to that of FIG. 4. The runway or conveyor 10 is shown in FIG. 6 as being disposed in the floor 68 of the building in which the conveyor system is installed, the span 10a being mounted on wheels 70 resting on rails 72. As beforementioned, the spans are driven by suitable means which need not be described for the purpose of this disclosure. Fixed to the floor at the side of the span 10a is the guideway comprising elongated beams 74 and 76 supported along their length on the floor by a plurality of spaced apart cross-ties, only one of which is shown in FIG. 7. L-shaped pieces 79 welded to the inside of the beams are secured as by bolts to the ties. Such ties adjacent opposite ends of the guideway are of modified construction such as shown in FIG. 6, to provide an upwardly projecting journal pin 80 which defines the axis of rotation for the main sprocket 28 which is received rotatably upon it. Each tie is provided with drive chain channels 82 and 84 with pairs of elongated chain supporting members 86 and 88 entering the channels as shown and extending along the guideway between successive ties to support the drive chain 30. The chain is guided for movement between the pairs of members 86 and 88 with the upper sides of the links 89 being pivotally connected by plates 90 which ride the upper faces of the members 86 and 88 on suitable wear pads 92. The lower sides of the chain links are connected by narrow plates 94 which pass between the pairs of guide members 86 and 88. The chain is held against upward movement by opposed pairs 96 and 98 of longitudinally extending members secured to the chain guides.

The sprocket which is the companion to sprocket 28 at the opposite end of the drive chain, is operatively connected in any suitable positive driving engagement with the drive means 32 schematically shown in FIG. 1 for driving such sprocket and in turn the chain. As those skilled in the art will readily appreciate a variety of possible drive connections to such sprocket to drive the chain, a further description thereof is believed unnecessary.

Figure 5:
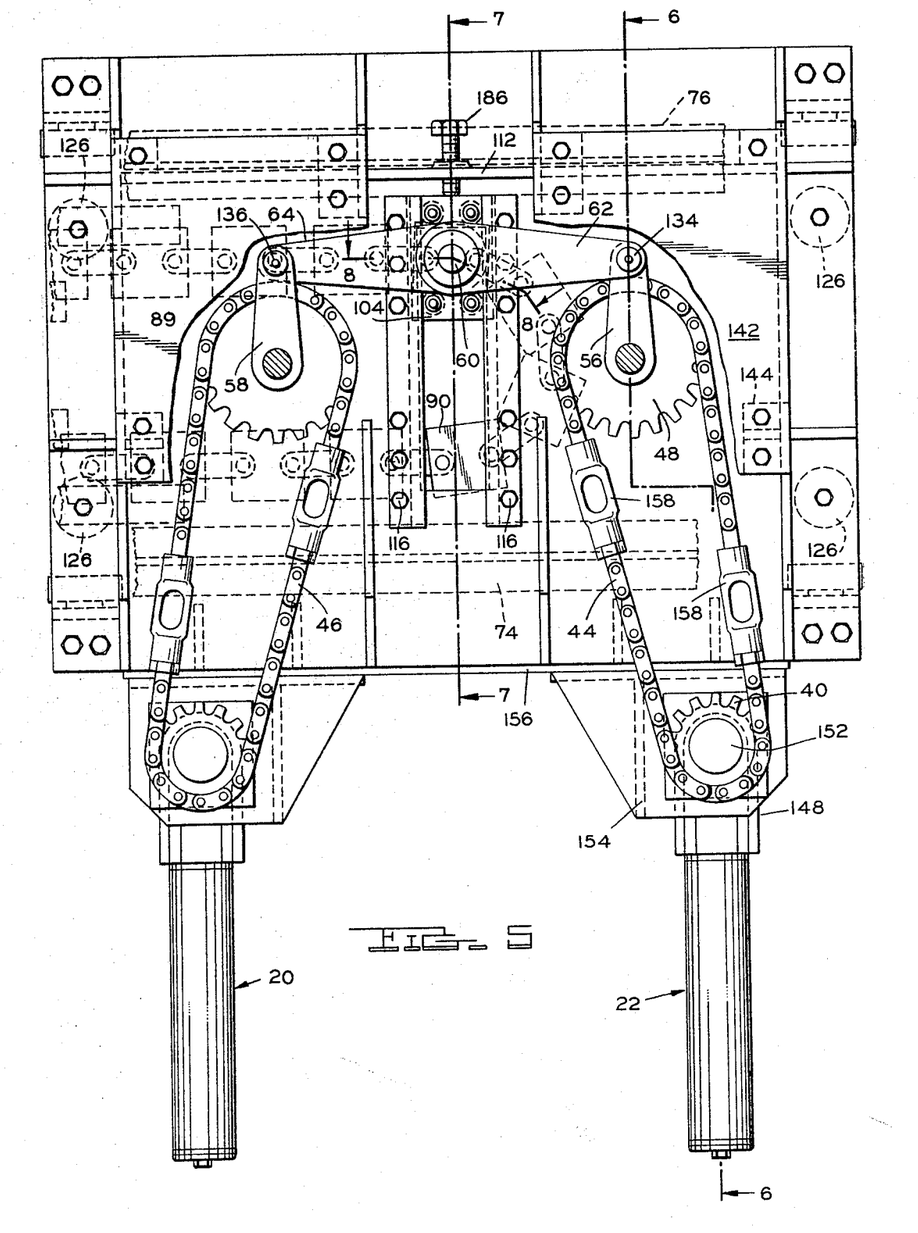
FIG. 5 is a plan view of an article transfer head embodying the invention.
Figure 8:
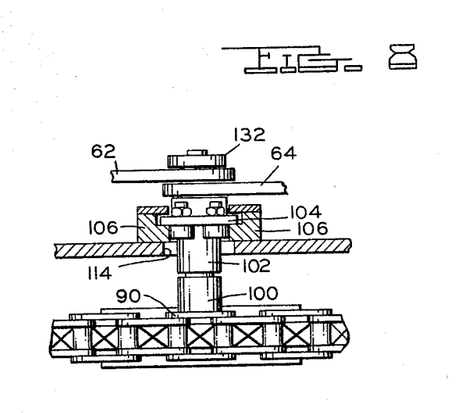
FIG. 8 is a fragmentary detail view taken on the line 8—8 of FIG. 5.

Secured to one of the plates 90 in upstanding relation is the sleeve 100 within which is received the lower end of pin 60 as shown in FIGS. 7 and 8. The pin is supported within a bushing 102 carried by a cross-head 104 supported in suitable ways 106 for translation laterally of the transfer head 16. The head 16 includes a frame having a horizontal plate 110 reinforced by vertical webs 112 and having a transverse slot 114 through which bushing 102 projects and may laterally reciprocate with the cross-head. The ways 106 are secured to plate 110 by bolts 116 as shown in FIG. 5. The plate 110 is supported by brackets 118 upon four wheels 120 which ride within the outer sides of the beams 74 and 76 between suitable wear strips 122 and 124. Lateral displacement of the transfer head is prevented by rollers 126 mounted adjacent each corner of the head to ride against guide strips 128 fixed to the upper faces of the beams 74 and 76.

Received in superposed relation over the upper end of bushing 102 to be supported by the shoulder 130 thereon are the links 62 and 64. They are made captive on the upper end of the bushing by a suitable retainer 132 secured to the bushing. The outer ends of links 62 and 64 are pivotally connected by pivot pins 134 and 136 to outer ends of cranks 56 and 58. The inner end of each crank is fixed to a hub which carries one of the sprockets 48 and 50. The construction of crank 56 and its associated sprocket 48 is shown in FIG. 6 and is representative of the construction of companion sprocket 50 and its associated crank 58. Sprocket 48 is mounted on a hub 138 which is supported upon a pin 140 which is secured to and extends from the plate 110 upwardly through another plate 142, which latter is supported above plate 110 by suitable brackets 144 connected to the upstanding webs 112. When the crank 56 is swung, it serves to turn the hub 138 and in turn the sprocket 48.

The article embracing arms or fingers, which may also be considered as article engaging members, are shown in detail in FIGS. 5 and 6. A description of arm 22 will suffice for both. The arm includes an axle 144 upon which is journaled a roller 146, suitable bearings being provided for this purpose. The inner end of the axle is received within a socket member 148 and secured therein in any suitable fashion. The socket member is secured to a vertically extending bushing 150 supported on the shaft 152 of sprocket 40. The shaft 152 is carried by suitable bearings in an outwardly or laterally facing channel-shaped bracket 154 secured as by welding or the like to a vertically extending, web-reinforced, plate 156 secured to the edge of plate 110 adjacent the runway. The chain 44, which may be provided with one or more tensioning links 158, is entrained over sprockets 40 and 48 such that upon rotatable movement of sprocket 48 the chain will drive sprocket 40 and in turn swing the associated arm 22. It will be noted that the arm swings through substantially 90 degrees of arc. Operation of arms 20 and 22 is conjoint.

As shown in FIG. 1 the spans 10a, 10b, 12a and 12b pass around suitable sprockets disposed beneath stationary wheel guides 160, 162, 164 and 166 each of which includes a horizontal plate over which the automotive wheel may roll and one or more upstanding guides at the longitudinal sides of such plate. A pair of islands 168 and 170 having at each of two sides wheel supporting plates 172, 174, 176 and 178 guide the vehicle wheels during their transfer by the transfer head across conveyor 14 to the W–2 positions. Vertical guide members 180 and 182 may be provided to assist the guiding function.

It will be understood that drive means 32' is connected to the drive chain 30' for operating the transfer head 18 similar to operation of head 16. In this connection it will be noted that movement of the drive chain in either direction will serve to reciprocate the transfer head but that the direction of movement of such chain will determine whether the article embracing arms are opened or closed at one sprocket or the other. Therefore transfer heads 16 and 18 may be identical in construction and the operation of the arms from the open to the closed positions is determined by the direction of travel of the chains 30 and 30'. It is to be understood that in a system of the type shown in FIG. 1 the drive chains would always move in the directions heretofore explained, unless for some reason it becomes desirable to reverse the direction of vehicle movement such that vehicles would be transferred from conveyor 12 to conveyor 10.

FIG. 9 schematically discloses a control system for the conveyor arrangement of FIG. 1. It is to be understood that this control system may be varied to suit the purpose for which the transfer apparatus is to be used and that the system shown in FIG. 9 is simply representative of one which is suitable for the particular operation contemplated by the conveyor system of FIG. 1. Conventional circuitry for supplying electric power to the drive means 32 and 32' has not been disclosed nor circuitry for powering the drive means for conveyor 14. The drive means for conveyor 14 is shown schematically at 14' in FIG. 1 and may include a suitable electric motor driving a sprocket mounted on a drive shaft which through additional sprocket arrangements is connected to the spans 14a and 14b to drive them upon operation of the electric motor. The electric motor is indicated at 184.

A detailed description of FIG. 9 is not given herein as such, based upon the following, should be apparent to those skilled in the art. Lines 186 and 188 are connected across a suitable source of electric potential. Three cam switches are provided indicated at LCLS, UCLS and TCLS in FIGS. 1 and 9. LCLS is operatively connected in any suitable fashion to be driven in synchronism with and upon movement of the drive chain 30; UCLS is similarly connected to drive chain 30'; TCLS is operatively connected to be driven in synchronism with and by movement of the conveyor spans 14a and 14b.

The method of driven connection of these cam switches to the respective parts of the system will be apparent to those skilled in the art, any suitable connection being contemplated. Each of these switches is provided with a series of cams which upon rotation serve to open and close various contacts in the circuit diagram of FIG. 9. The cams of each switch rotate conjointly.

In considering FIG. 9 the various cams and their associated contacts for the cam switches are indicated by a prefix designating the particular cam switch and a hyphenated suffix referring to the number of the cam and its contact. Thus, cam switch UCLS is provided with cams and contacts, UCLS–1, UCLS–2, etc. The condition of the contact is also indicated; NC indicates the contacts as being normally closed while NO indicates they are normally open. NOHC indicates the contacts are normally open but held closed by the cam lobe while NCHO indicates the contacts are normally closed but held open by the cam lobe. PER–1, PER–2, PER–3, and PER–5 shown in FIG. 1 schematically represent the position of electric eyes which sense the presence or absence, as the case may be, of a vehicle moving on the adjacent conveyor. These electric eyes serve to open or close correspondingly numbered contacts in the circuit of FIG. 9.

The circuit of FIG. 9 provides a control for the operation of the transfer heads and conveyor 14 such that when a conveyor head or conveyor 14 first begins to move to transfer a vehicle, the movement is slow, and then when the vehicle is moving the control system through the circuitry shown speeds up the drive motors to accelerate the movement, and as the vehicle approaches the end of its travel, the circuitry serves to decelerate the movement once again to the slower motion until the vehicle reaches its final position where the motors are stopped to interrupt further movement of the vehicle. This provides a smoother operation than would be the case if the drive motors always operated at the same speed, and affords high speed operation together with smoothness. The two-speed operation of the drive motors for the heads and conveyor 14 may be accomplished in any suitable fashion such as providing two-speed motors or two-speed transmissions between the motors and the drive sprockets.

With the above in mind, operation of the FIG. 1 conveyor system and the control circuit of FIG. 9 is as follows. As each vehicle approaches the pickup position indicated by wheel positions W–1 on conveyor 10, the left rear wheel of the vehicle interrupts the light beam of electric eye PER–2 and the rear bumper B–1 clears the light beam of electric eye PER–1. This initiates transfer head 16 setup relay 7CR and drive means 32 starts running at a slow speed.

If conveyor 14 is not at its index position (has not moved to a position indicated by cam switch TCLS such that it is ready to receive the vehicle) when LCLS–3 is opened, the drive means 32 will stop thereby interrupting further operation of transfer head 16. If stopped long enough a vehicle which may be following on conveyor 10 will interrupt the light beam of electric eye PER–1 and through suitable circuitry (not shown) operation of conveyor 10 will be interrupted.

Assuming that conveyor 14 is at its index position and that drive means 32 continues to operate, or when conveyor 14 reaches its index position thereupon restarting drive means 32 when the arms 20 and 22 have closed to their wheel embracing position, LCLS–1 will be closed to increase the speed of drive means 32 to accelerate the movement of the transfer head.

As head 16 approaches the end of its traverse, LCLS–1 opens thereby causing drive means 32 to decelerate to its slower motion operation, and just prior to the vehicle reaching its final position on conveyor 14, the right front wheel will trip 1LS latching relay 1LR.

When the transfer head reaches the solid outline position shown at 16 in FIG. 1, LCLS–4 opens stopping further operation of drive means 32. Timed delay relay 4TD times closed starting motor 184 at slow speed to drive conveyor 14 and move the vehicle from the W–2 position toward the W–3 position. When the vehicle is clear of transfer head arms 20 and 22, which is indicated by the rotation of cams in switch TCLS, TCLS–3 closes, unlatching 1LR and starting drive means 32 to return head 16 to its starting position at 16a. TCLS–1 closes causing motor 184 to operate at high speed to transfer the vehicle rapidly on conveyor 14.

As the conveyor 14 moves the vehicle near position W–3 the control circuit slows motor 184 so that conveyor 14 brings the vehicle to the W–3 position at slow speed and subsequently stops motor 184 when the vehicle is at the W–3 position. As the vehicle approaches the end of its travel on conveyor 14 the light beam of electric eye PER–3 is interrupted thereby latching 2LR to prevent further transfer movement until transfer head 18 has moved through its cycle of operation. Drive means 32' for head 18 will now start slowly and shift to fast speed similar to the operation of head 16 above described. When UCLS–5 opens it will stop the movement of transfer head 18 if for any reason a vehicle on conveyor 12 has not cleared the light beam set up by PER–5. The operation of drive means 32' to complete the cycle of operation of head 18 is controlled by the circuit of FIG. 9 in substantially the same fashion as the operation of head 16, and the transfer head 18 is returned to its solid outline position shown in FIG. 1.

It will be noted from an inspection of FIG. 5 that the lost motion linkage is self-locking when the arms 20 and 22 are in the closed position shown as any forces tending to swing the arms will react through links 62 and 64 substantially perpendicular to the direction of traverse of the cross-head. There is also an "overcenter" locking effect. Adjustment screw 186 is threadedly received through web 112 to abut cross-head 104 and limit its movement. The screw is adjusted so that the cross-head can move toward web 112 such distance that the axis of pin 60 is just beyond a line extending between the axes of pivot connections 134 and 136. As a consequence, any force between arms 20 and 22 tending to open them will be transmitted to the cross-head and in turn to screw 186. This combination of self-locking and overcenter locking of the lost motion linkage will relieve strain through pin 60 to the drive chain 30 which might otherwise be set up through reaction of an article engaged by the arms tending to open or close them; the pin will only have to carry the forces necessary to translate the head 16, with an engaged article, along the guideway.

What is claimed is:

1. An article transfer device comprising, in combination: a pair of sprockets disposed in spaced apart relation adjacent opposite ends of an intended path of article transfer, an endless chain entrained over and extending between the sprockets, drive means operatively coupled to the chain to drive it, a transfer head connected to the chain and supported for linear traverse between the sprockets upon a guideway paralleling the chain to reciprocate between the sprockets upon driving of the chain, an article engaging member for relative shiftable movement on the head toward and from the path of article transfer between, respectively, article engaging and non-engaging positions, and means connecting said member to a point on the chain to shift the member from one position to the other as said point of connection passes around each sprocket.

2. The invention as defined in claim 1 characterized in that said member is pivotally supported on the head and swingable between said article engaging and non-engaging positions.

3. An article transfer device comprising, in combination: an article runway along which articles are to be transferred, a transfer head reciprocable alongside the runway parallel thereto, a pair of article engaging members pivotally supported on the head to swing from a position extending away from each other and out of article engagement to a closed position embracing an article on the runway, means connected to said members to operate them conjointly, a pair of sprockets disposed in spaced apart relation adjacent opposite ends of the runway, a drive chain entrained over the sprockets and extending therebetween adjacent the path of reciprocation of the head, said means including a part connected to a point of the chain to move with the chain and around the sprockets with the movement around one sprocket shifting said part to swing the members to the open position and with the movement around the other sprocket shifting said part to move the members to the closed position, and said means serving as the driving connection between the head and chain to drive the head in its traverse between the sprockets.

4. An article transfer device comprising, in combination: a pair of sprockets disposed in spaced apart relation adjacent opposite ends of an intended path of article transfer, an endless chain entrained over and extending between the sprockets, drive means operatively coupled with the chain to drive it, a transfer head supported on a guideway for reciprocation between the sprockets along the spans of the chain and parallel the intended path of article transfer, an article engaging member pivotally mounted on the head for swingable movement toward and from the intended path of article transfer between, respectively, article engaging and non-engaging positions, means coupling the head to the chain including a lost motion connection allowing the point of connection to the chain to pass around each sprocket and draw the head back and forth between the sprockets upon movement of the chain, and said means including a part connected to said lost motion coupling and to said member to swing the member as aforesaid as the point of connection with the chain passes around each sprocket.

5. An article transfer device comprising, in combination: an article runway along which articles are to be moved, a pair of sprockets disposed in spaced apart relation along the runway, an endless chain entrained over and extending between the sprockets, drive means operatively coupled with the chain to drive it, a transfer head supported on a guideway for reciprocation between the sprockets along the spans of the chain and parallel to the runway, a pair of article embracing members pivotally mounted on the head to swing from a closed position embracing an article on the runway to an open position disposed out of engagement with articles on the runway, means coupling the head to the chain including a lost motion coupling allowing the point of connection to the chain to pass around each sprocket and draw the head back and forth between the sprockets upon movement of the chain, and said means including a drive connection between said lost motion coupling and said members to swing the members as aforesaid as the point of connection with the chain passes around each sprocket.

6. The invention as defined in claim 5 characterized in that each member includes an elongated roller with the members adapted to rollingly embrace an automotive wheel on the runway to roll the wheel along the runway and thereby transfer a vehicle supported by such wheel.

7. An automobile transfer device comprising, in combination: a runway along which automobiles are to be moved, a pair of drive sprockets supported in spaced relation at one side of the runway and adjacent thereto for rotation in a common plane, an endless drive chain entrained over the sprockets and extending alongside the runway, drive means operatively coupled to one of the sprockets to drive the chain, a transfer head supported on a guideway superposing the chain and extending between the sprockets with a head reciprocable on the guideway alongside and parallel to the runway, a pair of automobile wheel embracing fingers pivotally mounted on the transfer head for swingable movement from a position extending in parallel wheel embracing relation over the runway to a position swung away from the runway, a sprocket connected to each finger to swing it, a pair of motion transferring sprockets mounted on the head with one associated with each finger connected sprocket, a pair of chains with one entrained over each of the motion transferring sprockets and finger connected sprockets, a crank connected to each of the motion transferring sprockets, pin means mounted on the drive chain and extending latterly therefrom and movable with the drive chain, and a pair of links each connected at one end to the pin means and at the other end to one of said cranks, whereby as the pin means passes around one drive sprocket said fingers are swung to one position and as the pin passes between the sprockets it draws the transfer head along the guideway and as it passes around the other sprocket it swings the fingers to the other position.

8. An article transfer device comprising, in combination: an article runway having a receiving end to which articles are successively delivered, means sensing the presence of an article at such end of the runway, a transfer head reciprocable along the runway at the side thereof, said head including a pair of article embracing fingers swingably mounted thereon to swing conjointly from an open position extending away from each other and out of article embracing relation with an article on the runway through a closing phase during which the fingers swing toward each other over the runway to a closed position extending substantially parallel to each other and embracing therebetween an article on the runway, drive means connected to the transfer head to drive it through a cycle of operation comprising swinging the fingers at the article receiving end of the runway from an open to a closed position, shifting the transfer head along the runway with the fingers in such closed position, swinging the fingers to the open position when the transfer head reaches the opposite end of the runway, and returning the head along the runway to the receiving end thereof with the fingers in the open position, and said sensing means connected to said drive means to initiate said cycle of operation of the latter upon sensing an article at the receiving end of the runway.

9. A device for transferring articles between conveyors comprising, in combination: a pair of conveyors having substantially co-planar upwardly facing horizontal article supporting surfaces, a transfer head supported for reciprocation in a plane parallel to the article supporting surfaces of the conveyors and alongside said conveyors and parallel to the direction of article movement on at least one of the conveyors, an article engaging member pivotally mounted on the transfer head and swingable in a horizontal plane above the article supporting surfaces of the conveyors between positions extending over such surfaces to engage an article thereon and retracted away from the conveyors and out of engagement with an article thereon, mechanism coupled with said head and the swingable member thereon to shift the head and member through a cycle of operation comprising swinging the member to its article engaging position alongside one conveyor to engage an article thereon and shifting the transfer head to sweep the article engaged by the member from such conveyor to the other conveyor and retracting said member and returning the head with the member so retracted to its starting position, and means coupled with said mechanism for selectively initiating said cycle of operation when an article is to be transferred between the conveyors.

10. A device for transferring articles from the end of one conveyor to the head of another conveyor comprising, in combination: a pair of spaced apart main conveyors having substantially horizontal upwardly facing planar article supporting surfaces and from one to the other of which conveyors articles are to be transferred, a third conveyor extending from the end of one main conveyor to the head of the other main conveyor and having upwardly facing planar article supporting surface portions contiguous to the main conveyors and substantially co-planar with the article supporting surfaces thereof to receive articles from the end of one main conveyor and shift them to the head of the other main conveyor, a pair of transfer heads with one associated with each main conveyor and that portion of the third conveyor contiguous thereto, each head supported for reciprocation in a plane parallel to the article supporting surfaces of the associated conveyors and in the direction of article movement on the main conveyor, an article engaging member pivotally supported on each head and swingable in a horizontal plane above and adjacent the article supporting surfaces of the associated conveyors between positions extending over such surfaces to engage an article thereon and retract it away from the conveyors and out of engagement with an article thereon, mechanism coupled with each head and the swingable member thereon to shift the head and member through a cycle of operation comprising swinging the member to its article engaging position adjacent one conveyor to engage an article thereon and shifting the transfer head to sweep the article engaged by the member from such conveyor to the other contiguous portion of the other conveyor and retracting said member and returning the head with the member retracted to its starting position, control means coupled to said mechanism for each head and disposed to sense the delivery of an article at the end of one main conveyor and the delivery of an article by said third conveyor to the head of the other main conveyor to institute the cycles of operations of the heads.

11. An article transfer device comprising, in combination: an article runway along which articles are to be moved, a pair of sprockets disposed in spaced apart relation along the runway, an endless chain entrained over and extending between the sprockets, drive means operatively coupled with the chain to drive it, a transfer head supported on a guideway for reciprocation between the sprockets along the spans of the chain and parallel to the runway, a cross-head supported on the transfer head for reciprocation thereon substantially perpendicular to both the axes of rotation of the sprockets and the path of reciprocation of the transfer head, means coupling the cross-head to a point of the chain, an article engaging member mounted on the transfer head and operably connected to the cross-head to shift between positions extending over the runway to engage an article thereon and a position retracted from the runway out of article engagement as the point of connection of the cross-head and chain passes around the sprockets.

12. The invention as defined in claim 11 characterized in that the sprockets are supported for rotation about vertical axes and the cross-head is supported for reciprocation toward and away from the runway in a substantially horizontal plane, and said article engaging member moves between its article engaging and non-engaging positions in a horizontal plane.

13. The invention as defined in claim 12 characterized in that a pair of article engaging members are provided each of which is operatively connected to the cross-head with the members moving conjointly therewith between said positions of article engagement and non-engagement.

14. The invention as defined in claim 13 characterized in that the article engaging members are mounted on the transfer head for swingable movement toward and away from each other over the runway.

15. An article transfer device comprising, in combination: an article runway, a transfer head reciprocable along the runway at one side thereof, an article engaging member mounted on the transfer head and movable between a position extending over the runway to engage an article thereon to shift it along the runway and a position retracted away from the runway out of engagement with an article thereon, and means connected to the transfer head to reciprocate it including a control circuit for operating the drive means at a slow speed during initial and terminal portions of its article transferring movement and a higher speed during the remainder of its article transferring movement.

16. In an article transfer device a pair of sprockets disposed in spaced apart relation adjacent opposite ends of an intended path of article transfer, an endless chain entrained over and extending between the sprockets, drive means operatively coupled to the chain to drive it, a transfer head supported for reciprocating traverse between the sprockets upon a guideway extending alongside the intended path of article transfer, a cross-head connected to the chain and supported on the transfer head for guided reciprocation at right angles to the reciprocating traverse of the transfer head and the axes of said sprockets, and an article engaging arm mounted on the transfer head and coupled to the cross-head for movement toward the path of article transfer as the connection between the cross-head and chain passes around one sprocket and movable away from the path of article transfer as the connection between the cross-head and chain passes around the other sprocket.

17. The invention as defined in claim 16 characterized in that the coupling of said arm to the cross-head is such that article conveying forces reacting through said arm during transfer of an article engaged by the arm are effectively directed perpendicular to the transverse movement of the cross-head on the transfer head.

References Cited by the Examiner
UNITED STATES PATENTS

| | | | |
|---|---|---|---|
| 1,659,522 | 2/1928 | Ekvall | 198—179 |
| 3,200,967 | 8/1965 | Delzanno | 198—24 X |

EVON C. BLUNK, *Primary Examiner.*

R. J. HICKEY, *Assistant Examiner.*